United States Patent
Watson

(10) Patent No.: US 9,585,503 B2
(45) Date of Patent: Mar. 7, 2017

(54) DRY PRODUCT DOSAGE DISPENSER AND METHOD FOR PRODUCING SAME

(71) Applicant: The Quaker Oats Company, Chicago, IL (US)

(72) Inventor: Thomas Branton Watson, Chicago, IL (US)

(73) Assignee: The Quaker Oats Company, Chicago, IL (US)

( * ) Notice: Subject to any disclaimer, the term of this patent is extended or adjusted under 35 U.S.C. 154(b) by 118 days.

(21) Appl. No.: 14/278,142

(22) Filed: May 15, 2014

(65) Prior Publication Data
US 2015/0330823 A1    Nov. 19, 2015

(51) Int. Cl.
*G01F 11/28* (2006.01)
*A47G 19/34* (2006.01)
(Continued)

(52) U.S. Cl.
CPC .............. *A47G 19/34* (2013.01); *B23P 19/00* (2013.01); *B65D 25/02* (2013.01); *G01F 11/261* (2013.01);
(Continued)

(58) Field of Classification Search
CPC ......... A47G 19/34; B23P 19/00; B65D 25/02; B65D 25/04; G01F 11/28; G01F 11/282;
(Continued)

(56) References Cited

U.S. PATENT DOCUMENTS 2,980,297 A * 4/1961 Tucci .................... D06F 39/026
                                                        222/158
3,323,683 A * 6/1967 Cianciolo .............. A47G 19/24
                                                        222/142.6
(Continued)

FOREIGN PATENT DOCUMENTS

GB              413148 A  *  7/1934  ............ G01F 11/261
WO      2011104701 A1      9/2011

OTHER PUBLICATIONS

PCT International Search Report and Written Opinion for PCT/US15/31059 dated Oct. 27, 2015 (16 pages).
(Continued)

*Primary Examiner* — Frederick C Nicolas
*Assistant Examiner* — Bob Zadeh
(74) *Attorney, Agent, or Firm* — James R. Gourley; Celina M. Orr; Carstens & Cahoon, LLP

(57) ABSTRACT

A dry product dosage dispenser has a container with a cavity between top and bottom ends, a cap on the top end, and an internal partition extending between the top and bottom ends of the body, forming two sub-cavities within the body. The internal partition forms a diverging funnel-like structure giving each sub-cavity a wide upper opening on one end and a narrow lower opening on the opposite end to help product freely flow from one end to the other. Product passes from one sub-cavity to the other through an opening in the internal partition. The dispenser is flipped from its upright position to dispense the product passed through the opening. An adjustable volume compartment can be used at the second
(Continued)

end of the container to enlarge the volume of the dispenser and provide variable dosages. The internal partition may be removable or separate for use as an insert.

17 Claims, 12 Drawing Sheets

(51) Int. Cl.
*B23P 19/00* (2006.01)
*B65D 25/02* (2006.01)
*G01F 11/26* (2006.01)

(52) U.S. Cl.
CPC ............ *G01F 11/26* (2013.01); *G01F 11/262* (2013.01); *Y10T 29/49828* (2015.01)

(58) Field of Classification Search
CPC ........ G01F 15/00; G01F 15/001; G01F 11/26; G01F 11/261; G01F 11/262; Y10T 29/49828
See application file for complete search history.

(56) References Cited

U.S. PATENT DOCUMENTS

| | | | |
|---|---|---|---|
| 3,344,962 A * | 10/1967 | Popivalo | A47G 19/34 222/456 |
| 3,398,857 A * | 8/1968 | Alio | B65D 83/0409 221/190 |
| 3,704,777 A | 12/1972 | Linnebuhr | |
| 4,164,301 A | 8/1979 | Thayer | |
| 4,753,723 A * | 6/1988 | Willinger | A01K 63/045 210/167.23 |
| 4,842,726 A * | 6/1989 | Willinger | A01K 63/045 210/167.23 |
| 5,129,561 A | 7/1992 | Drobish | |
| 5,391,293 A | 2/1995 | Hansen | |
| 5,706,974 A | 1/1998 | Murdick et al. | |
| 5,839,619 A * | 11/1998 | Willer | G01F 11/263 222/368 |
| 5,850,919 A * | 12/1998 | Freed | B65D 51/28 206/534 |
| 5,850,944 A | 12/1998 | Robbins, III et al. | |
| 5,947,336 A | 9/1999 | Thompson | |
| 6,264,068 B1 * | 7/2001 | Ours | A47G 19/02 222/129 |
| 7,922,044 B2 | 4/2011 | Luchinger | |
| 7,946,452 B2 | 5/2011 | Hantman et al. | |
| 8,028,865 B2 | 10/2011 | DeJonge | |
| 8,574,647 B1 | 11/2013 | Gunderson | |
| 2006/0091153 A1 | 5/2006 | Evans et al. | |
| 2007/0221602 A1 | 9/2007 | Dib | |
| 2008/0067195 A1 * | 3/2008 | Jennings | B65D 1/0223 222/205 |
| 2012/0187066 A1 | 7/2012 | Redl | |
| 2012/0267401 A1 | 10/2012 | Schroedter | |
| 2013/0008919 A1 | 1/2013 | Honan et al. | |
| 2015/0330823 A1 * | 11/2015 | Watson | G01F 11/282 222/438 |
| 2015/0330824 A1 * | 11/2015 | Watson | G01F 15/001 222/438 |

OTHER PUBLICATIONS

Dual-Chamber Dispensing Bottles—Part 03 | Best in Packaging, posted Mar. 14, 2014, located at http://bestinpackaging.com/2013/09/27/dual-chamber-dispensing-bottles-part-03/, 8 pages.

Suredose—Liquid | Perimeter Brand Packaging, located at http://perimeterbp.com/suredose, 1 page.

Educational Youtube video entitled "This is How McDonalds Makes Their Fries"—posted on Oct. 12, 2012, video length 5:14, located at http://dailyoftheday.com/this-is-how-mcdonalds-makes-their-fries/.

* cited by examiner

1

DRY PRODUCT DOSAGE DISPENSER AND METHOD FOR PRODUCING SAME

BACKGROUND OF THE INVENTION

Technical Field

The present invention generally relates to dispensers of dry goods and, more particularly, the dosage dispensing of dry food or solid products, including edible dry substances or solids used in the preparation of foods or drinks.

Description of Related Art

Current food packaging products are aimed at providing consumers with ease of use, for example, with opening sealed packaging and/or re-sealing food products therein for future use or consumption. When dispensing of products in predetermined or measured quantities (i.e, a dose) is desirable, often additional valves, springs, latches, conveying tools, turnkeys or other somewhat complex mechanisms are added within or onto the packaging. Such packaging extras can be very costly to produce and/or ship. Traditionally, more cost effective efforts for dosage dispensing include the introduction of measuring cups, caps, or spoons within or onto the packaging. More recently, advances have been made in the area of liquid dispensing packaging in measured amounts such as with liquid detergent. However, in the area of dry goods, including edible solids, there remains a need for a convenient, cost-effective packaging or device that saves both time and effort for a consumer when dispensing specific predetermined desirable amounts. In addition, there is a need for packaging that would also provide for variable adjustable dosing amounts depending on the changing needs or preferences of one or more consumers.

SUMMARY OF THE INVENTION

A dry product dosage dispenser has a container with a cavity between top and bottom ends, a cap on the top end, and an internal partition extending between the top and bottom ends of the body, forming two hollow sub-cavities within the body. One sub-cavity is a product storage compartment or area, while the other sub-cavity is a product-dispensing compartment or area. The internal partition forms a diverging funnel-like structure giving each sub-cavity a wide upper opening on one end and a narrow lower opening on the opposite end to help product freely flow from one end to the other, depending on the orientation of the dispenser. Product passes from the product storage area to the product dispensing area through an opening in the internal partition. The opening may be formed along one edge of the internal partition between the internal partition and the inner wall of the container. The dispenser is flipped from its upright position to dispense a predetermined amount of dry product, which has passed through the opening. An adjustable volume compartment can be used at the second end of the container to enlarge the volume of the dispenser and provide variable dosages.

Dry product may be sealed within the dispenser when using the adjustable volume compartment. The narrow lower opening of the product storage area rests against the adjustable volume compartment and the cap on the first end covers the wide upper opening to seal the product in the storage area until dispensing is desired.

The internal partition may also be removable for use as an insert or insertable partition. As an insert, the partition is able to transform any container into a dry product dosage container. The insertable partition has a elongated portion that extends into an inclined portion, which when inserted into the container, forms the funnel-like structure described above and further detailed below. The elongated portion may comprise a semi-tubular shape.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE INVENTION

Figure 1:
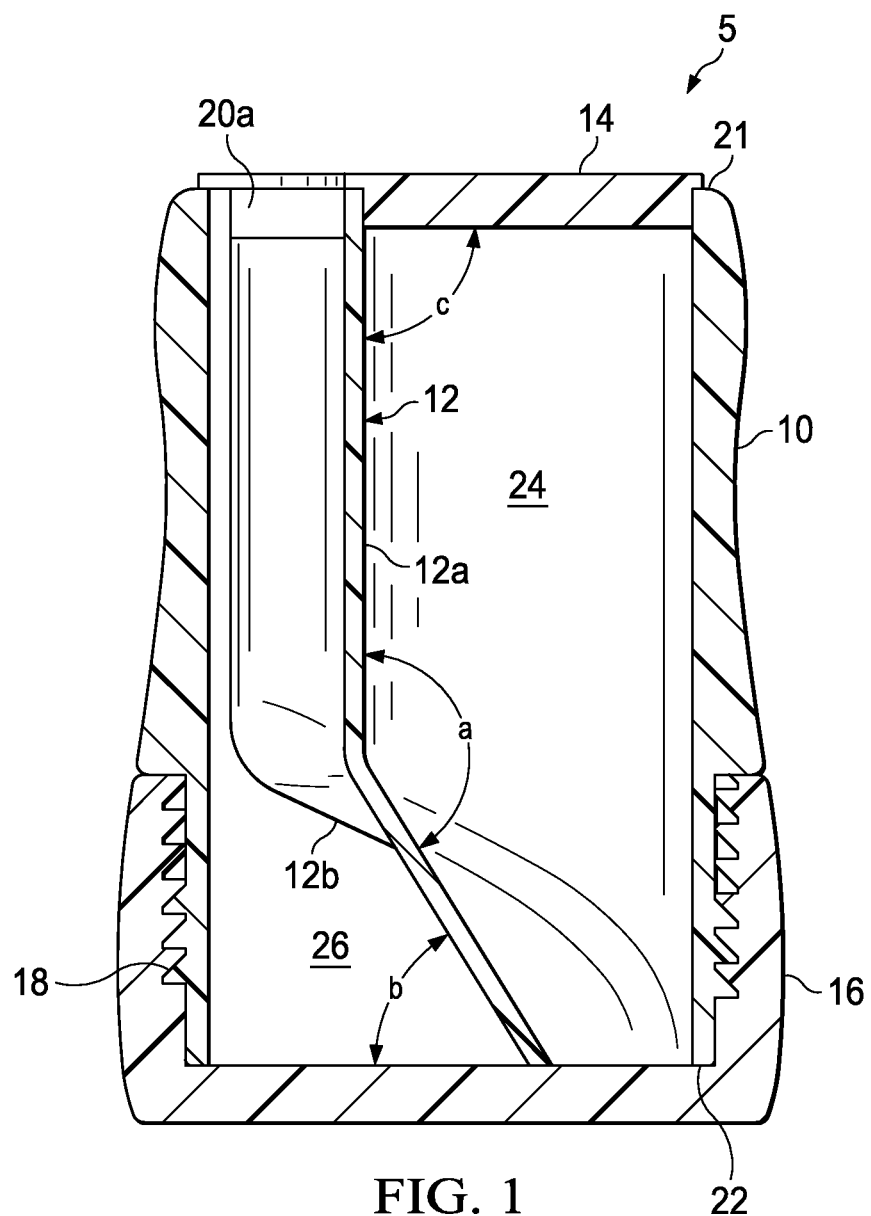
FIG. 1 is a cross-sectional view of one embodiment of the dispenser in a closed position without dry product therein.

A dry product dosage dispenser described herein may be used for dispensing doses of a dry product. As used herein, a "dry product" for use with the dispenser is meant to refer to any solid or non-liquid product capable of freely flowing under the influence of gravity such as those having granular, flake, grain, or powder qualities. In one embodiment, the dry product is meant to more specifically encompass a dry food product, dry food, solid food product, or an edible dry product, whether ready for direct consumption or for use in the preparation of foods for consumption, including without limitation grains, granular materials, flakes, and fine particles such as powders. By way of example, the dry product dispenser described herein can be used for any number of dry product including without limitation coffee grounds or beans, sugar (granulated or powdered), seeds, spices, oats, cereals, nuts, grains, baking powder, and seasonings as well as dry laundry detergent, sand, and salts useful for purposes other than food such as de-icing salt. In one embodiment, the dry product comprises an edible dry product selected from one or more of oats, cereals, seasonings, peanuts, almonds, cashews, pecans, pistachios, dried fruits, kernels, and sunflower seeds.

All components of the dry product dispenser described herein may be made of or comprise one or more of plastic, metal, cardboard, or any other material suitable for storing edible products and/or maintaining moisture of shelf-stable foods. By way of example, one or more components of the dry product dispenser may include without limitation any plastic made of formation techniques such as injection molding or thermoforming (including ABS plastic as ABS-containing plastics or other molded plastic), any cardboard containing materials such as spiral wound cardboard, or any other cardboard whether or not coated with a suitable plastic material to resist moisture and provide some rigidity. For handheld dispensing purposes, it is desirable to keep the dispenser lightweight and portable for easy to use access.

One embodiment of the dry product dispensing apparatus 5 will now be described with reference to the figures. In accordance with one aspect of the present disclosure, the dry product dosage dispenser 5 comprises a body 10 having a first end 21 and a second end 22 and a cavity there between, wherein the second end 22 comprises one of a closed end integral to the body or an adjustable volume compartment 16 for adjusting a volume of the cavity; a cap 14 on at least a portion of the first end 2 of the body; an internal partition 12 extending between the first end 21 and the second end 22 of the body, thereby dividing the cavity of the body into a first product storage area 24 and a second product dispensing area 26, the second product dispensing area 26 for dispensing of the dry product 25 from the first product storage area 24.

In one embodiment, the body 10 comprises a cylindrical shape. However, it should be noted that the body may comprise any number of shapes, including without limitation box, square, cube, triangular, ovular, or irregular shapes having one or more different shapes, so long as the other limitations are met to provide for flow of the dry product from the storage area and into the dispensing area as described herein.

Depending on the orientation of the dispenser, the first end 21 and second end 22 comprise top and bottom portions, respectively, to the body 10. In the upright position, the first end 21 is the top of the dispenser and the second end 22 is its bottom end. The first and second ends 21, 22 comprise a cavity there between, which is substantially hollow, having only the divider or internal partition 12 that extends from the first end 21 of the body to the second end 22 of the body and forms two sub-cavities 24, 26. One of the sub-cavities 24 being for dry product storage or receiving of dry product, and the other sub-cavity 26 being for dry product dispensing.

In an upright dispenser position, the cap 14 is above both the product storage area and the product dispensing area. Each of the first product storage area and the second product dispensing area extend alongside one another on either side of internal partition 12 within and along the length of the body 10, in between the first 21 and second 22 ends of the body. FIGS. 1, 4B, 5A-C, and 6A-C depict the cross-section side view of the dry product dispenser with the cross-section through the internal partition 12, which will be further described below.

Figure 9:
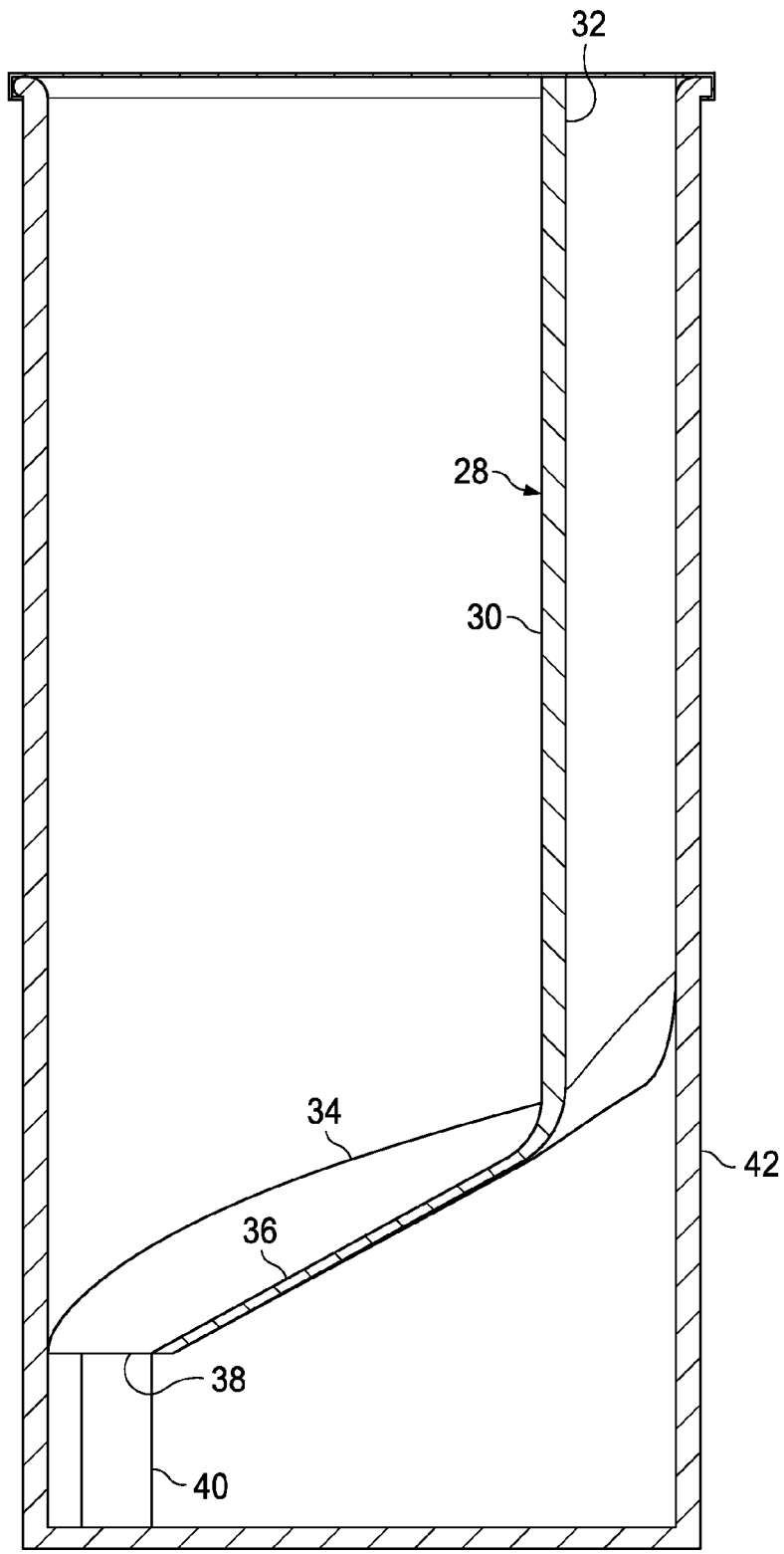
FIG. 9 depicts a cross-sectional view of an insert within a canister without dry product therein.

The second end 22 of the body 10 comprises one of a closed end integral to the body or an adjustable volume compartment for adjusting a volume of the cavity. The embodiment comprising a closed end integral to the body, shown for example in FIG. 9, provides for dispensing of a single dosage amount in a consistent manner. The embodiment comprising the adjustable volume compartment, shown for example in FIGS. 1-6, provides for dispensing of varied dosage amounts in a consistent manner. That is, both embodiments provide for dispensed amounts or doses of predetermined amounts of dry product from the dispenser; however, the adjustable volume compartment allows a consumer to dispense different measured amounts of dry product, thereby varying the doses. In addition, the adjustable volume compartment 12 allows for sealing of dry product within the product storage area when a cap covers the end of the product storage area opposite to the adjustable volume compartment.

As shown in FIGS. 5A-C and 9-10, whenever a common area of space 15 is present below the internal partition 12 and directly beneath the two-subcavities, the two sub-cavities are in direct contact with one another and allow for dispensing of the dry product from the product storage area. Thus, the first product storage area and the second product dispensing area are in direct contact with one another by way of a common area within the body, the common area directly beneath the first product storage area and the second product dispensing area. Passage through to the common area is through an opening formed in or by the internal partition, as will be described further below. The internal partition, however, prevents contact between the first product storage area and the second product dispensing area when the adjustable volume compartment meets an end of the internal partition.

Figure 2:
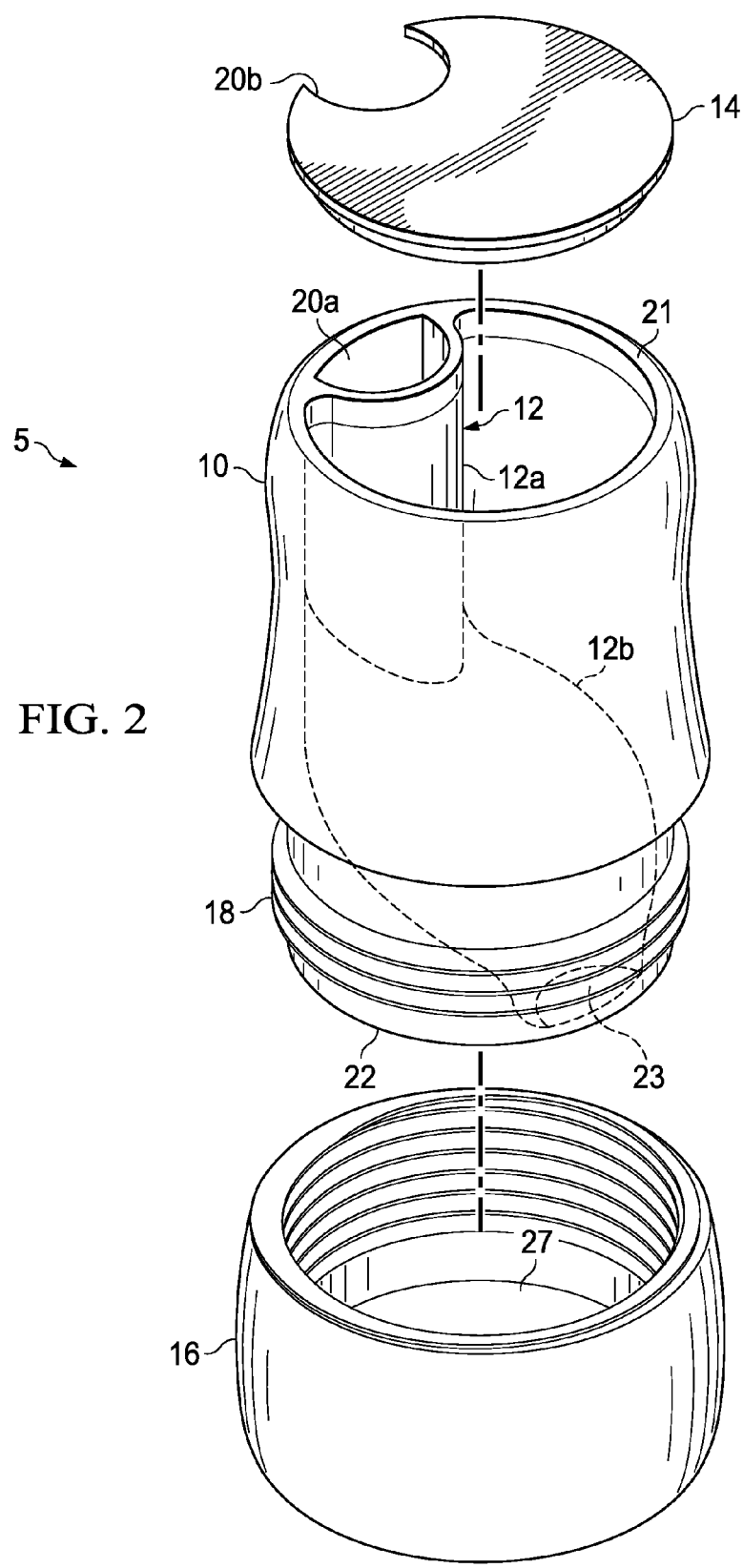
FIG. 2 is an exploded view of one embodiment of the dispenser.

In general, the cap 14 covers at least a portion of the first end of the body 10. In one embodiment, as best depicted in FIGS. 1 and 2, the cap 14 substantially covers the first end of the body 10 and comprises an exit port 20a through which product may exit from the dispenser, as further described below. As discussed above, the cap 14 may serve in part to seal a sub-cavity 24 closed on one end of the body 10. Thus, the cap may cover only the sub-cavity 24 in one embodiment. Alternatively, the cap may cover the entire first end of the body. However, in embodiments where the cap completely covers the periphery of the first end, it must be removable or it must comprise a removable portion to allow for dispensing of the dry product. The product storage area 24 must remain capped or closed at the first end during dispensing, whether through use of a separate seal, lid or cap, whether permanently or temporarily in place.

Figure 3A:
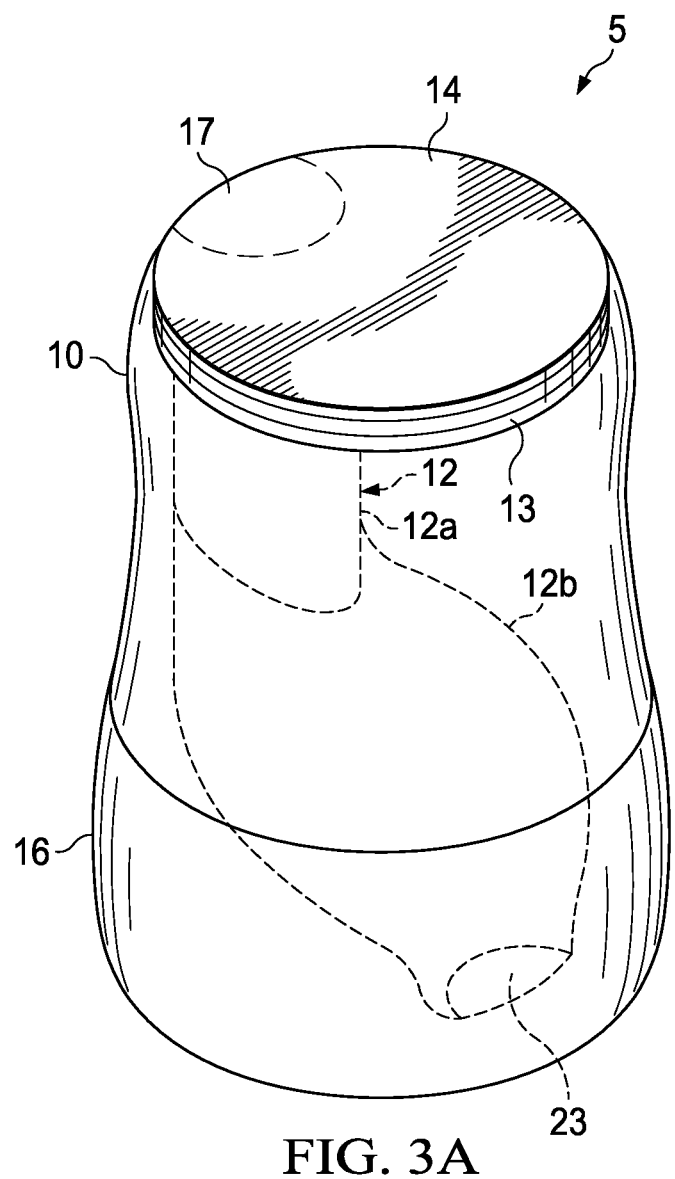
FIG. 3A depicts one embodiment of the cap of the dispenser.
Figure 3B:
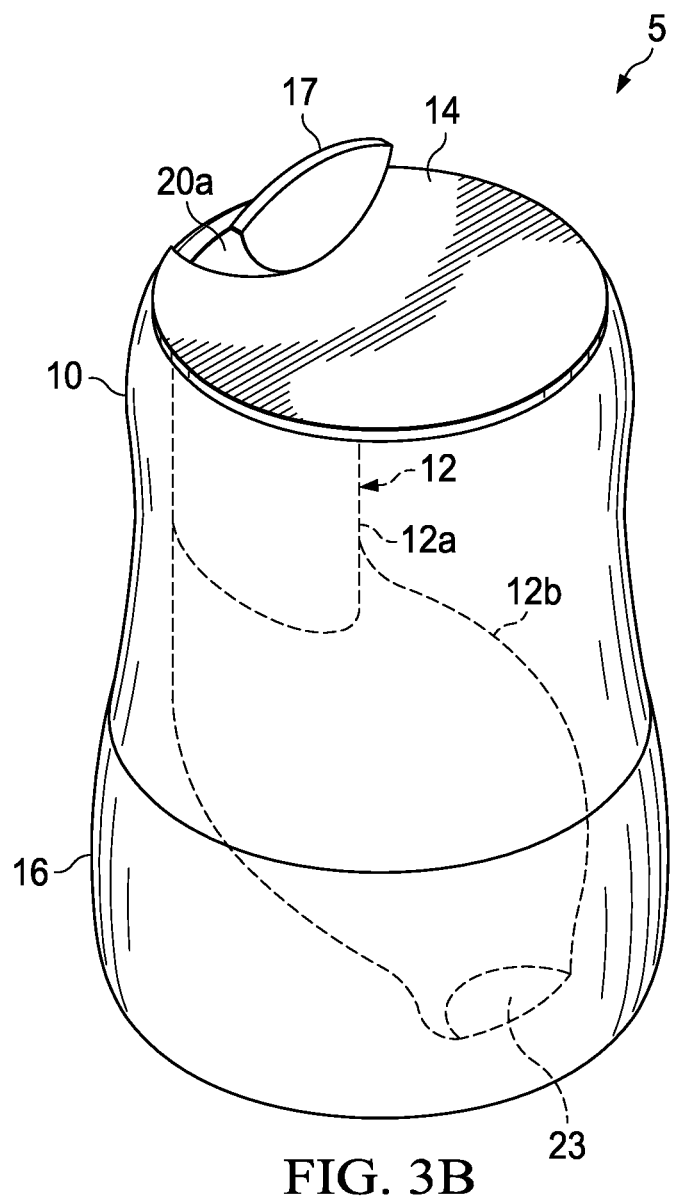
FIG. 3B depicts another embodiment of the cap of the dispenser.
Figure 4A:
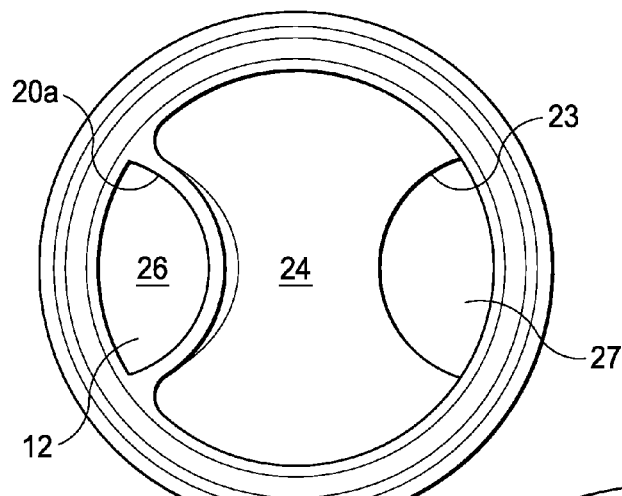
FIG. 4A depicts a top view of one embodiment of the dispenser without the cap.
Figure 4B:
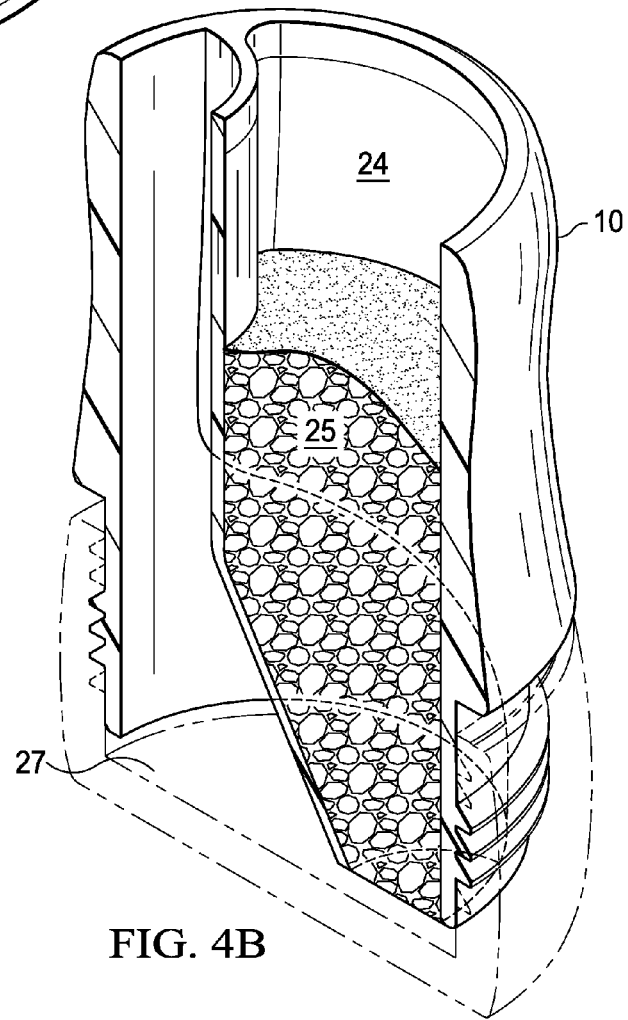
FIG. 4B is a perspective cross-sectional view of one embodiment of the dispenser having dry product therein.

As shown in FIG. 3a, in one embodiment, the cap 14 may comprise a tamper-proof type seal 13, which may cover the entire cap and a portion of the rim at the first end 21 of the body 10. In one embodiment, the cap may comprise a detachable portion 17 that may be either partially or fully removed to expose an exit port 20b. In one embodiment, the detachable portion 17 may comprise score lines, for example, which may be removed by a consumer through the application of pressure. In one embodiment, the detachable portion 17 may comprise a flip top cap, for instance, (as shown in FIG. 3B). Any other means known in the art may also be incorporated into the cap 14 for exposure of an exit port 20b in some embodiments. As shown in FIG. 2, the exit port 20b of the cap 14b may be present without any seal or detachable portion in one embodiment.

In one embodiment, the cap 14 is removable to ensure easy access to and selectively expose an area 24 within the body 10 for product receiving and storage. In another embodiment, the cap 14 is permanently fixed on one end to create a one-time only use disposable dispenser if desired. Embodiments having a permanently fixed cap integral to the entire first end of the body necessitate an exit port, or access to or formation of an exit port in the cap for dispensing of the dry product.

In one embodiment, the cap comprises a circumferential rim or flange that engages and seals against the first end of the body 10. As perhaps best shown in FIG. 2, the bottom of the cap 14 may comprise a lower wall or rim around its bottom side circumference that is slightly smaller than the circumference at the lip of the top of the body 10 with which it engages. The rim of the cap 14 securely fits around the top of the body 10 and ensures a snug fit that is maintained during dispensing processes (i.e., when the dispenser is turned upside down or rotated up to 180 degrees or more). While the cap 14 is shown in the FIGS. 1-2 to comprise a rim that extends downward from the cap, any secure or tight connection between the cap 14 and the body 10 is acceptable so long as the cap remains in place during dispensing. For example, the cap may also comprise a perimeter with an upper and lower edge adapted to fit over and around the lip of first end of the body or for engaging the first end of the body. In one embodiment, the cap 14 is substantially flat. In one embodiment, the cap 14 comprises flat external side and a flat internal side. Any cap shape that forms a seal with at least some portion of one end of the body 10 is possible.

As best depicted in FIG. 2, in one embodiment, the cap 14 comprises an exit port 20b. In one embodiment, the cap comprises an exit port 20b along one of its edges. In other embodiments, the exit port may be formed in any place in the cap in communication with the product dispensing area, or sub-cavity of the dispenser. In one embodiment, the exit port 20b comprises a rounded shape, which may include any shape semi-circular to circular, including without limitation a circle, half-circle, or gibbous shape. As used herein, the term gibbous refers to any rounded shape greater than a half circle. In practice, the exit port 20b may comprise any shape so long as it at least a portion of it aligns with an opening in the body 10 and does not interfere with product flow from the dispenser, as further described below. In some embodiments, the exit port 20b may comprise a tamper proof seal.

The size of the exit port 20b may vary in accordance with the particular dry product to be dispensed. In embodiments comprising a rounded shape, the exit port 20b may comprise an area of about 0.75 to about 1.75 inches. In some embodiments, by way of example, the exit port may comprise a diameter of between about 1.00 to about 1.5 inches. In one embodiment, the exit port 20b of the cap 14 aligns with a product-dispensing opening or discharge port 20a, which is formed by the internal partition, further described below.

In some embodiments, the internal partition 12 is rigid. The internal partition 12 may also be somewhat flexible in some embodiments, so long as the free movement of the dry product in the sub-cavities remains unfettered. In one embodiment, the internal partition 12 is permanently formed or fixed within the body 10. Thus, in one embodiment, the internal partition 12 may be integrated with the body 10 into a single structure. In one embodiment, the internal partition 12 may be removable. In other embodiments, the internal partition may form a separate removable piece or insert, which may be removed, for example, for cleaning and/or temporarily attached within the body 10 when dispensing is desirable. Such temporary attachment may be performed by any means known in the art. In an embodiment comprising a closed end integral to the body, the internal partition comprises a leg portion, said leg portion contacting the closed end integral to the body. One embodiment of an insert (also referred to herein as an insertable partition) will be further described below with reference to FIGS. 7-10.

As perhaps best shown in FIG. 2, in one embodiment, a portion of the internal partition 12 comprises an elongated portion or shape 12a and, together with an interior wall of the body 10, this shape forms a substantially vertical passageway that extends from the first end 21 of the body 10 before curving out and sloping downward towards the second end 22 of the body 10 and into an inclined portion 12b, described below. In one embodiment, the internal partition 12, together with an internal wall of the body, form a substantially vertical passageway that extends from the first end 21. In one embodiment, the substantially vertical passageway is tubular or tube-like. The length of the elongated portion or substantially vertical passageway may vary. In one embodiment, the elongated portion 12a extends at least halfway down the length of the body 10 before sloping down. In one embodiment, the elongated portion 12a extends about three-fourths of the way down the length of the body 10 before sloping down. In one embodiment, the elongated shape 12a is tubular or semi-tubular, thereby creating a substantially vertical tubular passageway extending down from the first end, which is formed by the elongated shape of the internal partition 12 and an interior wall of the body 10. The tubular passageway comprises a discharge port 20a on the first end of the body 10. As used herein, substantially vertical means the elongated portion or passageway formed in part by the elongated portion may be vertical or may deviate somewhat from perfectly vertical so long as it allows product to flow freely on or about a surface of the elongated portion to the discharge port 20a when the dispenser is flipped.

In one embodiment, the passageway 12a formed in part by the internal partition 12 forms a discharge port 20a, which communicates with the exit port 20b of the cap 14. Thus, the exit port 20b communicates with a discharge port 20a of the second product dispensing area 26, the discharge port 20a formed between the internal partition 12 and an internal wall of the body 10. In one embodiment, the exit port 20b substantially aligns with a discharge port 20a of the second product dispensing area at the first end of the body 10. The discharge port 20a may comprise any shape so long as it permits dry product to exit from the product dispensing area, as further described below. In one embodiment, the discharge port 20a comprises a rounded shape, which includes any shape from semi-circular to circular, including without limitation a circle, half-circle, or gibbous shape. In one embodiment, the discharge port 20a of the second product dispensing area is formed by and between the internal partition 12 and an internal wall of the body 10. The size and/or area of the discharge port 20a and/or the exit port 20b will vary depending on the dry product to be dispensed.

With reference again to FIG. 2, following the formation of the substantially vertical passageway, the internal partition 12 then comprises an inclined portion 12b that spans the internal perimeter of the body 10, contacting interior walls of the body while moving down towards a narrow opening 23 at the bottom end 22 of the body 10. More specifically, the internal partition 12 comprises an inclined portion 12b with a perimeter that spans at least a substantial portion of an internal perimeter of the body 10, said inclined portion 12b forming an angled top surface and an angled bottom surface, thereby providing passage or ramp for the dry product.

As used herein, a substantial portion of an internal perimeter (i.e., perimeter or circumference of the inner walls) of the body means that the periphery of the inclined portion may span or contact almost an entire perimeter of the interior side of the body except that a gap or opening is formed between the inclined portion and the interior wall of the body or container. Thus, a small piece of the periphery of the inclined portion recedes from the periphery and back towards the center of the inclined portion, forming a depression-type portion in the periphery, leaving a small open space formed in between the inclined portion of the partition and a wall of the body or container. The open space may be a C-shaped, U-shaped, V-shaped, semi-circular, or semi-ovular portion, for example, within the outer edge or periphery of the inclined portion. Alternatively, the inclined portion may also span an entire perimeter if, for example, an opening is made elsewhere within the inclined portion independent of the wall.

With reference to FIG. 1, in one embodiment, the inclined portion 12b comprises an obtuse angle a as it slopes downward relative to the passageway 12a and forms an inclined angle on both its top and bottom surfaces. The angle a may vary depending upon the size, length, perimeter or circumference of the body 10 so long as the inclined portion 12b provides an inclined surface on which dry product is forced downwards. In one embodiment, the angle a may range from about 100 to about 145 degrees. In one embodiment, the angle a may range from about 115 to about 135 degrees. In one embodiment, the angle a comprises between about 125 to about 130 degrees. In one embodiment, the inclined portion 12b further comprises a second steeper slope in its center (similar to that discussed below and shown in FIG. 7A) to further force the dry product down. Either surface of the inclined portion 12b should provide a ramped or funneled surface for the undisturbed flow of the dry product within the first product storage area into a common area under the partition at the second end of the body which will be further described below. In one embodiment, one end of the internal partition 12 forms an acute angle b with the interior of the adjustable volume compartment. In one embodiment, the angle b may range from between about 20 to about 80 degrees. In one embodiment, the angle b may range from about 30 to about 45 degrees. In one embodiment, the angle b may comprise about 35 degrees. In one embodiment, the angle b may comprise about 60 degrees. With reference to a horizontal plane passing through rim of the body or container, in one embodiment, the internal partition 12 comprises an angle c ranging from about 45 to about 95 degrees. In one embodiment, the angle c may range from about 80 to about 95 degrees. In one embodiment, the angle c comprises about 90 degrees.

The internal partition 12 comprises a curvilinear shape. As depicted in the figures, the internal partition 12 is asymmetrical about at least one plane passing through the dispenser. As best depicted in FIG. 2, in one embodiment, the internal partition 12 is asymmetrical along about a plane perpendicular to the cross-section shown in FIGS. 1, 3B and 4-5 (i.e., a vertical plane that passes substantially through the product storage area (and not the passageway of the elongated portion 12a) and divides the dispenser into right and left halves). As shown in FIGS. 1, 4B and 5-6, the internal partition 12 is symmetrical about only one plane in one embodiment. More particularly, the internal partition 12 is symmetrical about a vertical plane that passes through the middle of the passageway of the elongated portion 12a, dividing the dispenser into equal halves.

As depicted in the FIGS. 1-6, the internal partition 12 forms a diverging funnel-type structure in each of the first product storage area 24 and the second product dispensing area 26. The diverging funnel-type structure forming in one of the first product storage area and the second product dispensing area, for example, a wide upper opening on one end of the body opposite a narrow lower opening on the other end. That is, in the upright position of the dispenser 5, the internal partition 12 forms in the first product storage area 24 a wide upper opening at the first end 21 and a narrow lower opening 23 at the second end 22. In one embodiment, the narrow lower opening 23 of the first product storage area 24 contacts the inner side 27 of the adjustable volume compartment 16 when the apparatus is in a closed position and the cap 14 covers the wide upper opening, thereby sealing the dry product 25 within the first product storage area 24. When the dispenser 5 is turned upside down, the internal partition also forms in the second product dispensing area 26 a wide upper opening at the second end 22 and a narrow lower opening at the first end 21. Thus, there is a funnel-like effect in each of the first product storage area 24 and the second product dispensing area 26, which is utilized for dispensing the dry product. The wide opening of one sub-cavity is on the same end of the body 10 as the narrow opening of the other sub-cavity, and vice versa. Thus, the internal partition 12 forms two sub-cavities and four openings in the body 10, two openings on each end 21, 22. In one embodiment, both openings on either end of the body are formed in part by an interior wall of the body 10. It should further be noted that the internal partition is a solid structure. While openings are formed in part by the internal partition at either end of the container, the internal partition comprises no holes along the internal length of the body.

At the second end of the body 10 is an adjustable volume compartment 16, which is used to adjust the volume of the cavity between the first 21 and second 22 ends. As best shown in FIG. 1, in the closed position of the dispenser, an end of the internal partition 12 at the second end 22 of the body 10 meets the interior side of the adjustable volume compartment 16. The contact between the internal partition 12 and the adjustable volume compartment 16 thereby prevents contact between the two sub-cavities 24, 26 until dispensing is desired, as described above.

In one embodiment, the adjustable volume compartment 16 comprises a circumferential rim extending about a periphery of the adjustable volume compartment 16, said rim for mating with the second end of the body 10. In one embodiment, the circumferential rim comprises threading for mating with corresponding threading near the second end of the body. Thus, in one embodiment, the adjustable volume compartment 16 is attached to the bottom end of the body 10 by way of threads 18 such that the adjustable volume compartment 16 is adjusted, for example, by way of rotation through the screw interface. In one embodiment, the body 10 comprises an exterior male threaded interface, while the adjustable volume compartment 16 comprises an internal female threaded interface. While the connection between the body 10 and the adjustable volume compartment 16 is shown as threads, other popular means of attachment could also be used by those skilled in the art so long as the volume between the internal partition and the adjustable volume compartment is lengthened or enlarged, including without limitation a sliding mechanism. In principle, both the cap 14 and the adjustable volume compartment 16 on opposing ends of the body 10 can be releasably connected to the body by any state-of-the-art connection.

Figures 5A, 5B:
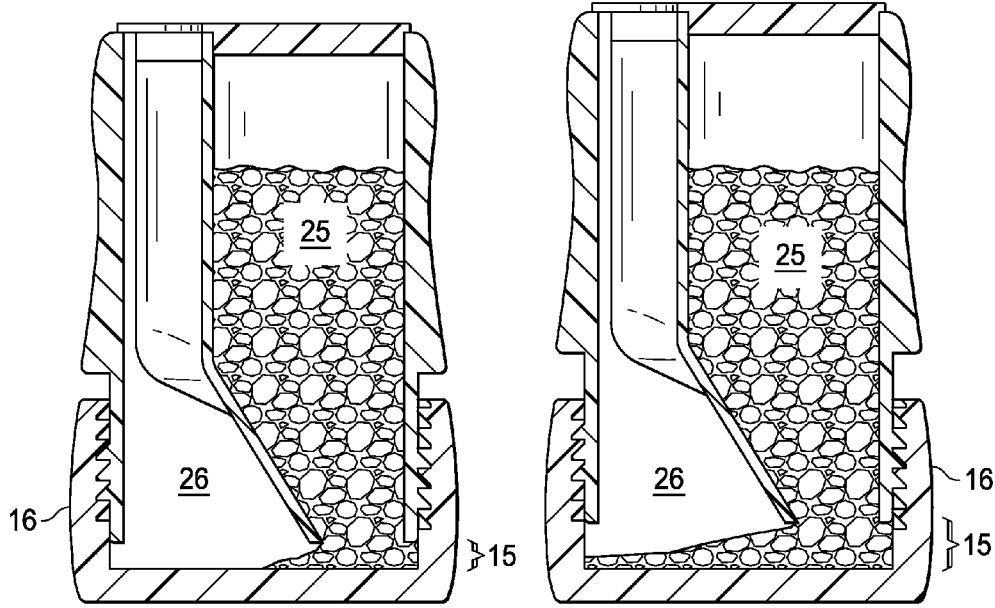
FIG. 5A is a cross-sectional view of one embodiment of the dispensing device when substantial closed having dry product therein.
FIG. 5B is a cross-sectional view of one embodiment of the dispensing device when adjusted to receive a measured quantity of dry food from the product storage area.
Figure 5C:
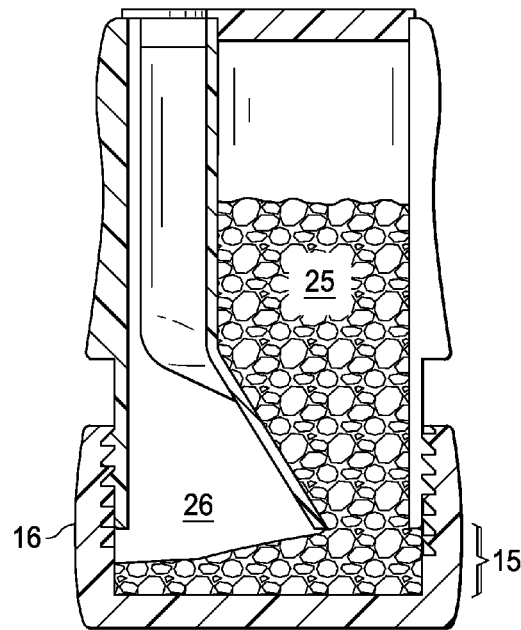
FIG. 5C is a cross-sectional view of one embodiment of the dispensing device when adjusted to receive a measured quantity of dry food from the product storage area.

The adjustable volume compartment 16 is vertically adjustable to create a variable common area of space 15 within the cavity of the body directly under the first product storage area 24 and the second product dispensing area 26, said variable common area of space creating an open communication between the first product storage area 24 and the second product dispensing area 26 for dispensing of the dry product. The variable common area of space 15 is in fact an enlargeable volume of space within the cavity. Referring now more specifically to FIGS. 5A-C, as the adjustable volume compartment 16, is vertically displaced or moved away from the body 10 from a closed position, as shown in FIG. 5A, a common area of space 15 is formed. The enlarged volume of space creates open communication between the first product storage area 24 and the second product dispensing area 26. Prior to desired dispensing, the volume adjustment compartment 16 is moved away from the body 10 such that the product 25 will begin to flow down from the narrow opening of the product receiving area 24 and into the volume adjustment compartment 16 as shown in FIG. 5A. FIG. 5B depicts the volume adjustment compartment 16 having been further displaced away from the body to form a larger common area 15 under the partition 12 into which more product 25 has moved. FIG. 5C shows additional downward vertical displacement of the volume adjustment compartment 16 and a corresponding additional amount of product 25, which has been forced down into a further enlarged common area 15 and onto the interior side of the volume adjustment compartment 16. Thus, essentially to dispense the dry product 25 in embodiments comprising an adjustable volume compartment, the volume adjustment compartment 16 is adjusted to increase the volume of the body 10.

Figure 6A:
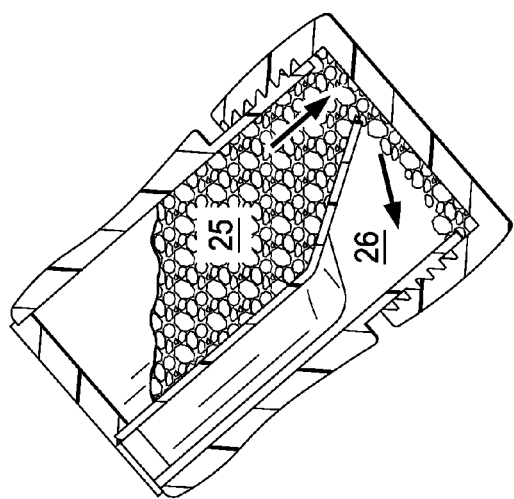
FIG. 6A depicts the dry product flow from the product storage area after adjustment of the volume compartment into the product-dispensing compartment during dispensing.
Figure 6B:
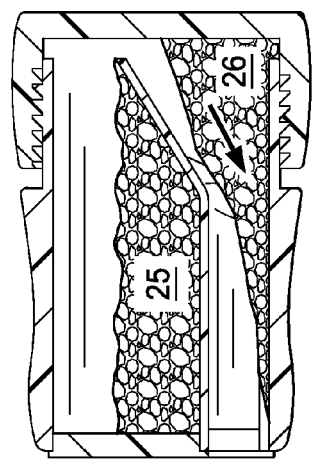
FIG. 6B depicts the dry product flow along the length of the product-dispensing compartment during dispensing.
Figure 6C:
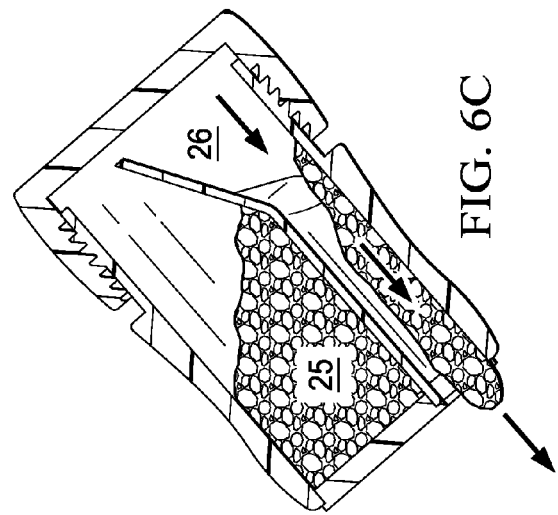
FIG. 6C depicts the dry product flow through the exit port of the dispenser.

FIGS. 6A-C depict the flow of dry product 25 during dispensing according to one embodiment. To dispense product through the exit port 20b of the cap 14, once a desired amount of product is forced out of the opening 23 of the product storage area 24 through displacement of the volume adjustment compartment 16, the dry product dispenser 5 must be flipped from its upright position to take advantage of gravity. Essentially, after the dry product 25 flows from product storage area 14 through the opening 23 into the common area under the partition 12, flipping the dispenser 5 causes the dry product 25 to flow through the substantially vertical passageway of the product dispensing area 26 and then through the discharge port 20a of the second product dispensing area. FIG. 6A depicts the flow of dry product 25 when flipping of the dispenser is begun. As shown by the arrows, product 25 flows from the first product storage area 24 and into a common area 15 directly below the two sub-cavities 24, 26. As shown in FIG. 6B, as the dispenser 5 is further turned, product, which is essentially then within the second product dispensing area, travels through the passage formed in part by the elongated portion 12a therein and, as in FIG. 6C, out through the discharge port 20a, which is in direct communication with the exit port 20b. In one embodiment, the dispenser is turned from its upright standing position by an angle of at least 45 degrees for proper dispensing. Other embodiments that flip the dispenser greater than 45 degrees will allow for faster exit of dry product from the dispenser. During dispensing, only a very small amount of product (less than 1%) may re-enter the product storage area 24. Thus, the dispenser provides for consistent amount of dry product to be dispensed at any given time so long as the dispenser is flipped so that product rolls down between the first product storage area and the second product dispensing area.

The adjustable volume compartment 16 allows for various amounts of product 25 to be dispensed to account for different serving sizes, different products and/or different consumer preference, for example. Controlling the adjustable volume compartment directly effects how much product is dispensed. Generally, the further the adjustable volume compartment is displaced away from the body 10, the greater the volume of the common area 15 and the greater the amount of product dispensed. Conversely, a smaller common area 15 provides for a smaller dose of dry product. It should be noted that in some embodiments, the volume of the adjustment compartment could also be fixed to consistently deliver the same amount of product with every use.

Either the body 10 or the adjustable volume compartment 16 may comprise, on its exterior, marked measurements for consumer reference in some embodiments. The dispenser may further optionally comprise a product level window or similar indicator to show how much product has been dispensed or remains.

As evident by the above description, the dispenser described herein may be composed of or consist of only three separate parts-a body 10 with an internal partition 12 formed therein, a cap 14, and a volume adjustment compartment 16 in one embodiment. In another embodiment, the dispenser may consist of only four separate parts when internal partition 12 is made to provide a fourth separate piece while still providing for maximum use of the volume within the dispenser. As such, the dispenser is simple and easy to manufacture. In addition, the present design allows for maximum use of space within the dispenser.

The motion for dispensing is simple and convenient and can provide for one-handed operation with no additional components. No latch, no turnkey, no valve or valve system, no spring, no conveying tool, no separate measuring device, no rotating wheel, no metering screw, no rolling pin device, and no motorized drive mechanism is necessary.

In accordance with another aspect of the present disclosure, and in relation to FIGS. 7-10, an insertable partition is described for transforming a canister into a dry product dosage dispenser. The insertable partition 28 generally comprises an enlongated portion 30 having an interior side 32 opposite an exterior side, and a first end opposite a second end; an inclined portion 34 extending down from the second end of the enlongated portion at an angle, said angle negatively sloping away from the interior side and comprising a first surface that is an extension of the exterior side of the elongated portion 30 and an opposing second surface that is an extension of the interior side; and a supporting member 40 extending down from a bottom end of the inclined portion 34; wherein the inclined portion 34 comprises one of an opening between the first surface and the opposing second surface or a receding portion 38 along one edge.

The elongated portion 30 runs substantially vertically or vertically lengthwise and, when inserted into a canister 42, along one side or portion of the inner walls of the canister, making contact therewith. When inside the canister, the second end of the elongated portion 30 deviates from contact with the walls; more specifically, the interior side 32 of the elongated portion 30 curves away from the walls as it slopes and becomes the opposing second surface of the inclined portion 34. In one embodiment, the elongated portion 30 is semi-tubular and has an interior arc side, which becomes the opposing second surface of the inclined portion 34. In other embodiments, the elongated portion may also comprise a more box-like shape, for example, having two parallel sides and one side in between and perpendicular to the parallel sides to form a square-like passageway when inserted into a canister. The size or depth of the elongated portion 30 may vary according to the dry product to be dispensed. By way of example, the interior arc side of a semi-tubular portion 30 may comprise a depth/arc of between about 0.75 to about 1.75 inches.

In one embodiment, the transition between the elongated portion 30 and the inclined portion 34 is a seamless junction that provides a smooth surface for the dry product to slide down without being redirected or stopped. In one embodiment, a perimeter of the inclined portion 34 is symmetrical about the elongated portion. In one embodiment, the perimeter of the inclined portion 34 is symmetrical about the elongated portion 30 with the supporting member 40 consisting of a pair of legs, and the receding portion is C-shaped and along a bottom central edge in between the pair of legs. The length of the supporting member 40 may vary according to the desired volume of dry product to be dispensed. Generally, the longer the supporting member 40, the bigger the dry product dosage. Conversely, the shorting the length of the supporting member 40, the smaller the dry product dosage.

Figure 7A:
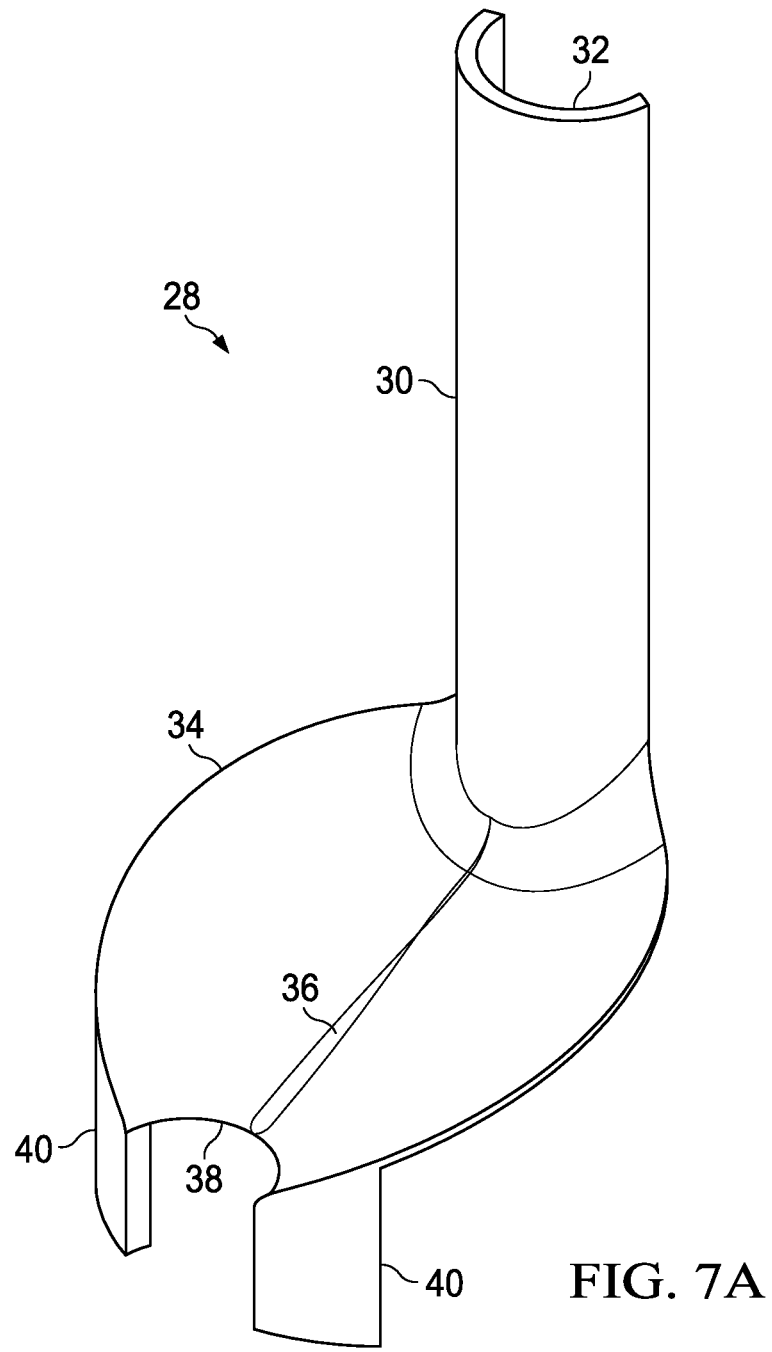
FIG. 7A depicts a perspective view of one embodiment of an insert according to one aspect of the present disclosure.
Figure 8:
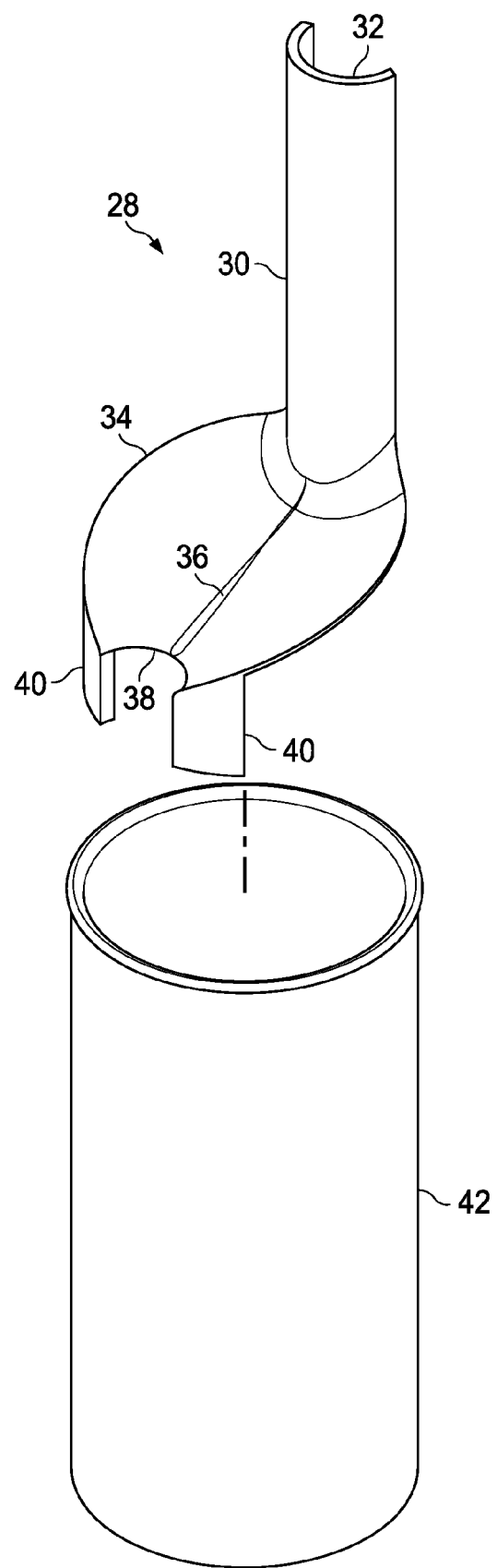
FIG. 8 depicts an exploded perspective view of the insert of FIG. 7A as introduced into a canister.

With reference to FIG. 7A, in one embodiment, the perimeter of the inclined portion 34 comprises a receding portion 38 along one edge. As used herein, a receding portion is meant to refer to an edge portion along the outer perimeter of the inclined portion that retreats back and towards the center of the inclined portion such that a gap is formed when the insertable partition is placed within the canister. In this embodiment, the inclined portion 34 comprises a perimeter of a shape to directly contact at least a substantial portion of an internal perimeter (or inner circumference) of the inner walls of a canister. In other words, when inserted into the canister, as shown in FIG. 8, the receding portion forms an opening along an edge of the inclined portion, which is in between the inclined portion and a wall of the canister.

Figure 7B:
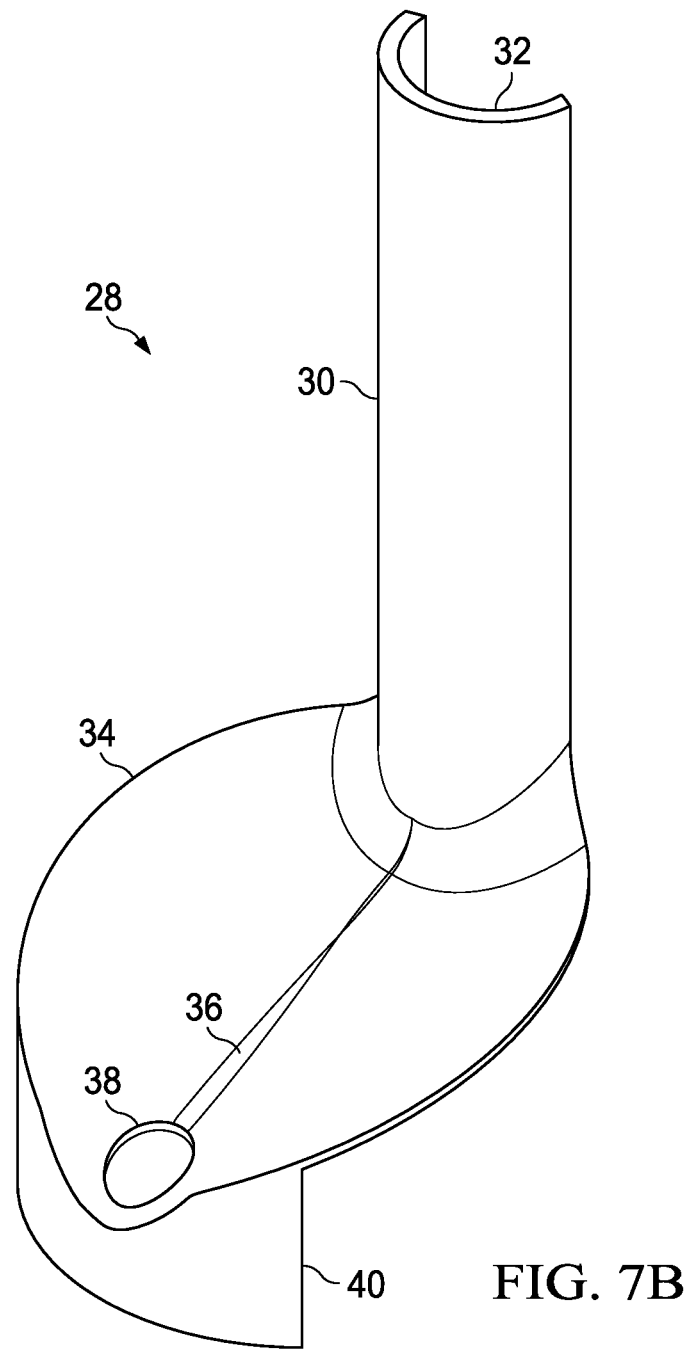
FIG. 7B depicts a perspective view of another embodiment of an insert.

With reference to FIG. 7B, in one embodiment, the inclined portion comprises an opening extending between the first surface and the second surface to allow for dry product to exit from a storage area for dispensing. In this embodiment, the perimeter of the inclined portion 34 extends fully out, with no receding portion, to directly contact an entire inner perimeter or inner circumference of the inner walls of a canister.

Figure 10:
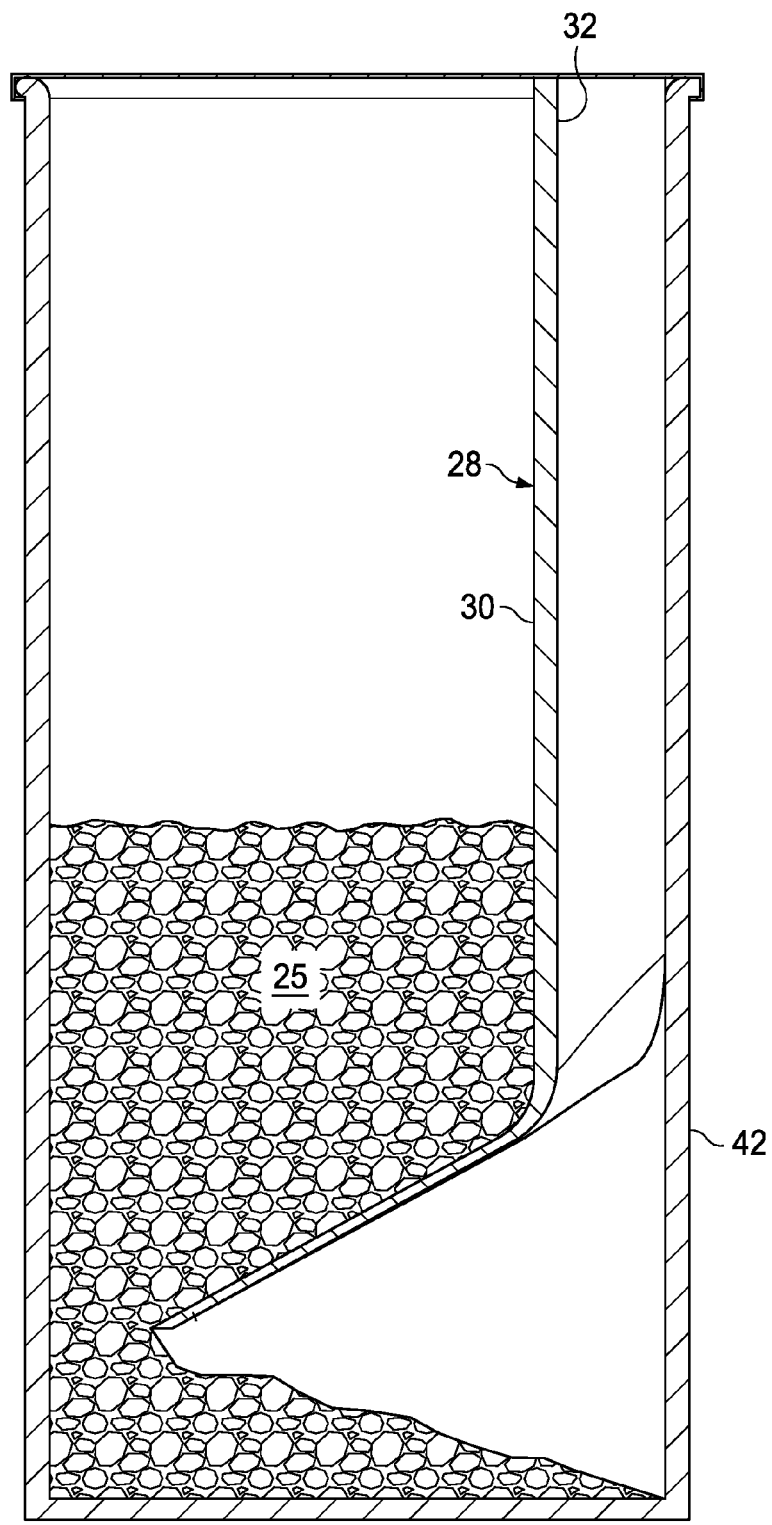
FIG. 10 depicts a cross-sectional view of an insert within a canister having dry product therein.

Thus, the insertable partition is shaped to leverage the inner walls of any container or canister into which it is inserted. FIGS. 9 and 10 depict a cross-section view of one embodiment of the insertable partition within a canister or container having a closed integral bottom end, with and without dry product therein, respectively.

In one embodiment, the first surface of the inclined portion is slightly concave and the opposing second surface is correspondingly convex. In one embodiment, the inclined portion 34 is curvilinear and slopes with respect to a circumferential direction and a radial direction. The inclined portion 34 may further comprise a banked perimeter to help funnel or guide dry product towards the opening or gap, which as described above is formed between a first product receiving area and a second product dispensing area when the partition is placed in a container with a body, or canister. Any number of angles would work for the banked portion so long as the edges slant such that product flows downward through the opening. In one embodiment, the inclined portion optionally comprises a second steeper slope 36 extending down to a centered point at the opening or receded portion 38 to further force product down through therethrough. The slope 36, when present, preferably comprises a seamless transition from the remaining inclined portion to allow for smooth flow of dry product.

Another aspect of the present disclosure relates to a method of forming a dry product dosage dispenser. The method generally comprising the steps of providing a container with an open (i.e., hollow) body having a first end and a second end with a cavity there between; forming two sub-cavities within the cavity with an internal partition that extends from the first end to the second end, wherein the internal partition comprises an inclined portion having a perimeter in direct contact with at least a substantial portion of an internal perimeter of the body and wherein the two sub-cavities consist of a first product storage area and a second product dispensing area; and capping at least a portion of the first end of the container; wherein the second end comprises a bottom piece selected from one of an integral closed end or an adjustable volume compartment movably connected to the second end of the body. The container and its cavities may then comprise any limitation as discussed above with regard to the figures.

In one embodiment, the capping step comprises covering the first product storage area. The cap should be secured to the first product storage area such that it remains in place when the dispenser is moved from its upright position. In one embodiment, the capping step comprises covering the first end of the body with a cap comprising a detachable portion, said detachable portion removable to expose an exit port for the dry product, wherein said exit port is in communication with a discharge port of the second product dispensing area. In one embodiment, the capping step comprises a removable cap.

As depicted in the figures, the internal partition together with an internal wall of the body form a substantially vertical passageway that extends down from the first end of the body before extending into the inclined portion. Thus, an opening or discharge port is formed on the first end. The substantially vertical passageway may be tubular or tube-like in one embodiment. Along some portion of the length of the container, the substantially vertical passageway deviates from the inner wall and into the inclined portion, which then inclines down into an opening at the second end of the container. In one embodiment, the opening of the substantially vertical passageway at the first end and/or the opening at the second end formed by the internal partition may be annular.

In one embodiment, the internal partition is curvilinear and comprises a slightly banked surface that slopes with respect to a circumferential direction and a radial direction. Accordingly, the dispenser is formed with an internal partition forming a funnel-type structure in each of the two sub-cavities, said funnel-type structure forming a wide upper opening opposite a narrow lower opening in each of the sub-cavities. Depending on the orientation of the container, only one of each sub-cavity will comprise the wide upper opening opposite narrow lower opening. That is to say, one end of the container will comprise a wide upper end of one sub-cavity and a lower narrow end of the other sub-cavity. In one embodiment, the internal partition is removable. In another embodiment, the internal partition is integrated with the body into a single structure.

The method of forming the dispenser may comprise providing an internal partition with one of an opening between two opposing surfaces or a receded portion along one edge, as described above. When the second end of the container comprises an integral closed end, the internal partition further comprises a supporting member extending down from the inclined portion. The supporting member may comprise a leg portion in one embodiment, or a pair of legs in another embodiment. In one embodiment, the internal partition comprises a leg portion at the bottom end of the inclined portion, said leg portion contacting the closed end integral to the body. When the second end of the container comprises an adjustable volume compartment, the method further comprises vertically adjusting the adjustable volume compartment to create a common area of space within the cavity, wherein said common area of space creates an open communication between the first product storage area and the second product dispensing area. As described above, the adjustable volume compartment may be vertically adjusted by being displaced away from the body to create a variable common area of space.

Any specific angles or specific sizes of the openings or exits provided herein help ensure consistent and more desirable (i.e., user-friendly) flow rates from the dispenser. However, changes to the geometry or any angles mentioned herein would still allow for dispensing of dry product though perhaps not delivering a consistent or specific dosage every time. Accordingly, discussion of angles and sizes is for illustrative purposes only and not intended to limit the scope of all embodiments unless otherwise noted.

While this invention has been particularly shown and described with reference to certain embodiments, it will be understood by those skilled in the art that various changes in form and detail may be made therein without departing from the spirit and scope of the invention. The inventor expects skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

ADDITIONAL DESCRIPTION

The following clauses are offered as further description of the disclosed invention.

1. A dry product dosage dispenser, said dispenser comprising: a body having a first end and a second end and a cavity there between, wherein the second end comprises one of a closed end integral to the body or an adjustable volume compartment for adjusting a volume of the cavity; a cap on at least a portion of the first end of the body; an internal partition extending between the first end and the second end of the body, thereby dividing the cavity of the body into a first product storage area and a second product dispensing area, the second product dispensing area for dispensing of the dry product from the first product storage area.

2. The dry product dosage dispenser according to any preceding clause wherein the first product storage area and the second product dispensing area are in direct contact with one another by way of a common area within the body directly beneath them.

3. The dry product dosage dispenser according to any preceding clause wherein the internal partition prevents contact between the first product storage area and the second product dispensing area when the adjustable volume compartment meets an end of the internal partition.

4. The dry product dosage dispenser according to any preceding clause wherein the cap comprises an exit port for the dry product.

5. The dry product dosage dispenser according to any preceding clause wherein the internal partition comprises an inclined portion with a perimeter that spans at least a substantial portion of an internal perimeter of the body, said inclined portion forming an angled top surface and an angled bottom surface, thereby providing passage for the dry product.

6. The dry product dosage dispenser according to any preceding clause wherein the internal partition forms a diverging funnel-type structure in each of the first product storage area and the second product dispensing area.

7. The dry product dosage dispenser according to any preceding clause wherein the internal partition together with an internal wall of the body form a passageway that extends from the first end of the body.

8. The dry product dosage dispenser according to any preceding clause wherein an exit port in the cap communicates with a discharge port of the second product dispensing area, the discharge port formed between the internal partition and an internal wall of the body.

9. The dry product dosage dispenser according to any preceding clause wherein the adjustable volume compartment comprises a circumferential rim extending about a periphery of the adjustable volume compartment, said rim for mating with the second end of the body.

10. The dry product dosage dispenser according to clause 9 wherein the circumferential rim comprises threading for mating with corresponding threading near the second end of the body.

11. The dry product dosage dispenser according to any preceding clause wherein a narrow lower opening of the first product storage area contacts the adjustable volume compartment when the apparatus is in a closed position and the cap covers a larger top opening of the first product storage area, thereby sealing the dry product within the first product storage area.

12. The dry product dosage dispenser according to any preceding clause wherein the adjustable volume compartment is vertically adjustable to create a variable common area of space within the cavity, said variable common area of space creating an open communication between the first product storage area and the second product dispensing for dispensing of the dry product.

13. The dry product dosage dispenser according to any preceding clause wherein the cap is removable.

14. The dry product dosage dispenser according to any preceding clause wherein the body comprises a cylindrical shape.

15. The dry product dosage dispenser according to any preceding clause wherein the internal partition is integrated with the body into a single structure.

16. The dry product dosage dispenser according to any preceding clause wherein the internal partition is removable.

17. The dry product dosage dispenser according to any preceding clause wherein the internal partition comprises a leg portion, said leg portion contacting the closed end integral to the body.

18. An insertable partition for transforming a canister with inner walls into a dry product dosage dispenser, said insertable partition comprising: an elongated portion having an interior side opposite an exterior side, and a first end opposite a second end; an inclined portion extending down from the second end of the elongated portion at an angle, said angle negatively sloping away from the interior side and comprising a first surface that is an extension of the exterior side of the elongated portion and an opposing second surface that is an extension of the interior side; and a supporting member extending down from a bottom end of the inclined portion; wherein the inclined portion comprises one of an opening between the first surface and the opposing second surface or a receding portion along one edge.

19. The insertable partition according to clause 18 wherein the first surface of the inclined portion is slightly concave and wherein the opposing second surface is correspondingly convex.

20. The insertable partition according to any one of clauses 18-19 wherein the inclined portion is curvilinear and comprises a slightly banked surface that slopes with respect to a circumferential direction and a radial direction.

21. The insertable partition according to any one of clauses 18-20 wherein the elongated portion runs substantially vertically lengthwise along one side of the inner walls of the canister.

22. The insertable partition according to any one of clauses 18-21 wherein the inclined portion comprises a perimeter of a shape to directly contact at least a substantial portion of a perimeter of the inner walls of the canister.

23. The insertable partition according to any one of clauses 18-22 wherein the perimeter of the inclined portion is symmetrical about the elongated portion.

24. The insertable partition according to any one of clauses 18-23 wherein the perimeter of the inclined portion is symmetrical about the elongated portion with the supporting member consisting of a pair of legs, and the inclined portion comprises the receding portion, wherein the receding portion is C-shaped and along a bottom central edge in between the pair of legs.

25. A method of forming a dry product dosage dispenser, said method comprising the steps of: providing a container with a body having a first end and a second end with a cavity there between; forming two sub-cavities within the cavity with an internal partition that extends from the first end to the second end, wherein the internal partition comprises an inclined portion having a perimeter in direct contact with at least a substantial portion of an internal perimeter of the body and wherein the two sub-cavities consist of a first product storage area and a second product dispensing area; capping at least a portion of the first end of the container; wherein the second end comprises a bottom piece selected from one of an integral closed end or an adjustable volume compartment movably connected to the second end of the body.

26. The method according to clause 25 wherein the capping step comprises covering the first product storage area.

27. The method according to any one of clauses 25-26 wherein the capping step comprises covering the first end of the body with a cap comprising a detachable portion, said detachable portion removable to expose an exit port for the dry product, wherein said exit port is in communication with a discharge port of the second product dispensing area.

28. The method according to anyone of clauses 25-27 wherein the internal partition together with an internal wall of the body form a substantially vertical passageway that extends from the first end of the body before extending into the inclined portion.

29. The method according to any one of clauses 25-28 wherein the internal partition is curvilinear and comprises a slightly banked surface that slopes with respect to a circumferential direction and a radial direction.

30. The method according to any one of clauses 25-29 wherein the internal partition forms a funnel-type structure in each of the two sub-cavities, said funnel-type structure forming a wide upper opening opposite a narrow lower opening in each of the sub-cavities.

31. The method according to any one of clauses 25-30 wherein the internal partition comprises one of: an opening between two opposing surfaces or a receded portion along one edge.

32. The method according to any one of clauses 25-31 wherein the internal partition is removable.

33. The method according to any one of clauses 25-32 wherein the internal partition is integrated with the body into a single structure.

34. The method of according to any one of clauses 25-33 wherein the capping step comprises a removable cap.

35. The method according to any one of clauses 25-34 wherein the internal partition comprises a leg portion, said leg portion contacting the integral closed end.

36. The method according to any one of clauses 25-34 wherein the adjustable volume compartment is vertically adjustable to create an enlarged volume of space within the cavity, wherein said enlarged volume of space creates an open communication between the first product storage area and the second product dispensing area.

I claim:

1. An insertable partition for transforming a canister with inner walls into a dry product dosage dispenser, said insertable partition comprising:
    an elongated portion having an interior side opposite an exterior side, and a first end opposite a second end;
    an inclined portion extending down from the second end of the elongated portion at an angle, said angle negatively sloping away from the interior side and comprising a first surface that is an extension of the exterior side of the elongated portion and an opposing second surface that is an extension of the interior side; and
    a supporting member extending down from a bottom end of the inclined portion;
    wherein the inclined portion extends down to a centered point at one of an opening at a bottom central edge between the first surface and the opposing second surface or a receding portion along the bottom central edge, wherein said insertable partition is a solid structure, and wherein the inclined portion comprises a perimeter of a shape to directly contact at least a substantial portion of a perimeter of the inner walls of the canister.

2. The insertable partition of claim 1 wherein the first surface of the inclined portion is slightly concave and wherein the opposing second surface is correspondingly convex.

3. The insertable partition of claim 1 wherein the inclined portion is curvilinear and comprises a slightly banked surface that slopes with respect to a circumferential direction and a radial direction.

4. The insertable partition of claim 1 wherein the elongated portion runs substantially vertically lengthwise along one side of the inner walls of the canister.

5. The insertable partition of claim 1 wherein the perimeter of the inclined portion is symmetrical about the elongated portion.

6. The insertable partition of claim 1 wherein the perimeter of the inclined portion is symmetrical about the elongated portion with the supporting member consisting of a pair of legs, and the inclined portion comprises the receding portion, wherein said receding portion is C-shaped between the pair of legs.

7. The insertable partition of claim 1 wherein when the inclined portion extends down to the centered point at the opening at the bottom central edge, the opening is the sole opening within the insertable partition.

8. The insertable partition of claim 1 wherein the angle between the elongated portion and the inclined portion consists of an obtuse angle.

9. A method of forming a dry product dosage dispenser, said method comprising the steps of:
- providing a container with a body having a first end and a second end with a cavity there between;
- forming two sub-cavities within the cavity with an internal partition that extends between the first end to the second end, wherein the internal partition comprises an inclined portion having a perimeter in direct contact with at least a substantial portion of an internal perimeter of the body, the internal partition forming a narrow lower opening at a bottom central edge of the internal partition, and wherein the two sub-cavities consist of a product storage area and a product-dispensing area, the product storage area in communication with the product-dispensing area via the narrow lower opening of the internal partition;
- capping at least a portion of the first end of the container; wherein the second end comprises an integral closed end.

10. The method of claim 9 wherein the capping step comprises covering the product storage area with a substantially flat cover over the first end of the container.

11. The method of claim 9 wherein the capping step comprises covering the first end of the body with a cap comprising a detachable portion, said detachable portion removable to expose an exit port for the dry product, wherein said exit port is in communication with a discharge port of the product dispensing area.

12. The method of claim 9 wherein the internal partition together with an internal wall of the body form a substantially vertical passageway that extends from the first end of the body before extending into the inclined portion.

13. The method of claim 9 wherein the internal partition is curvilinear and comprises a slightly banked surface that slopes with respect to a circumferential direction and a radial direction.

14. The method of claim 9 wherein the internal partition forms a funnel-type structure in each of the two sub-cavities, said funnel-type structure forming a wide upper opening opposite the narrow lower opening.

15. The method of claim 9 wherein the internal partition is removable.

16. The method of claim 9 wherein the capping step comprises a removable cap.

17. The method of claim 9 wherein the internal partition comprises a leg portion, said leg portion contacting the integral closed end.

\* \* \* \* \*